Figure 1:
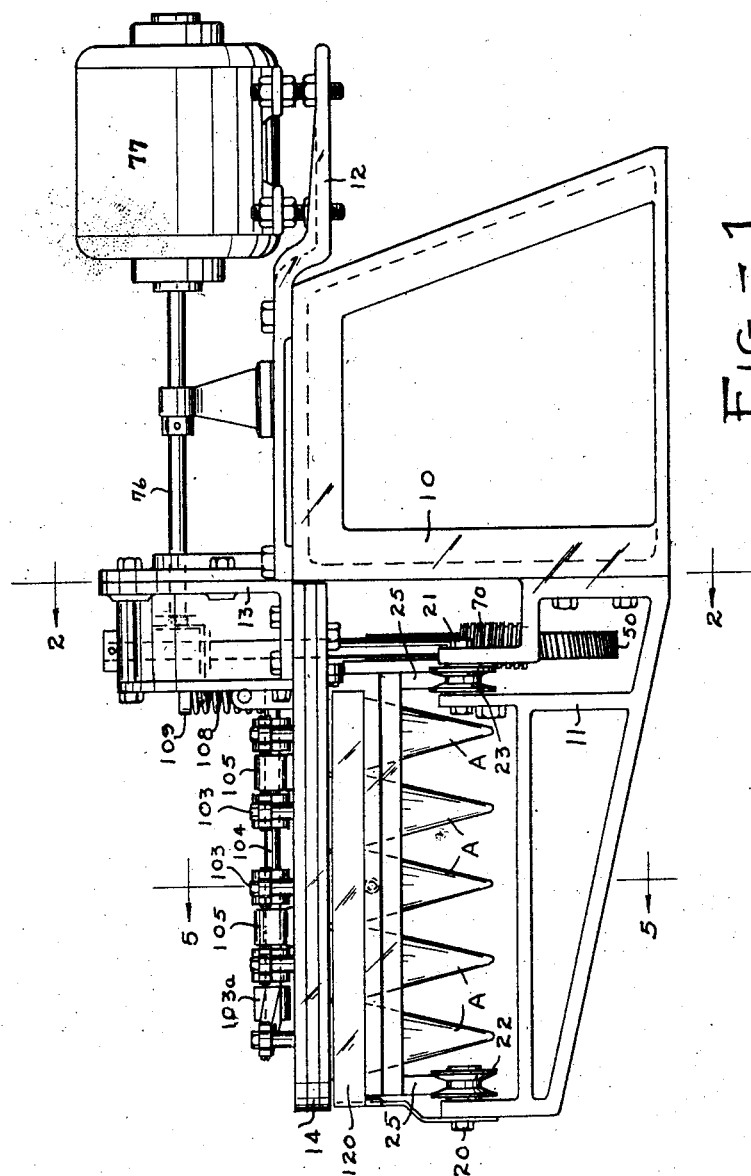

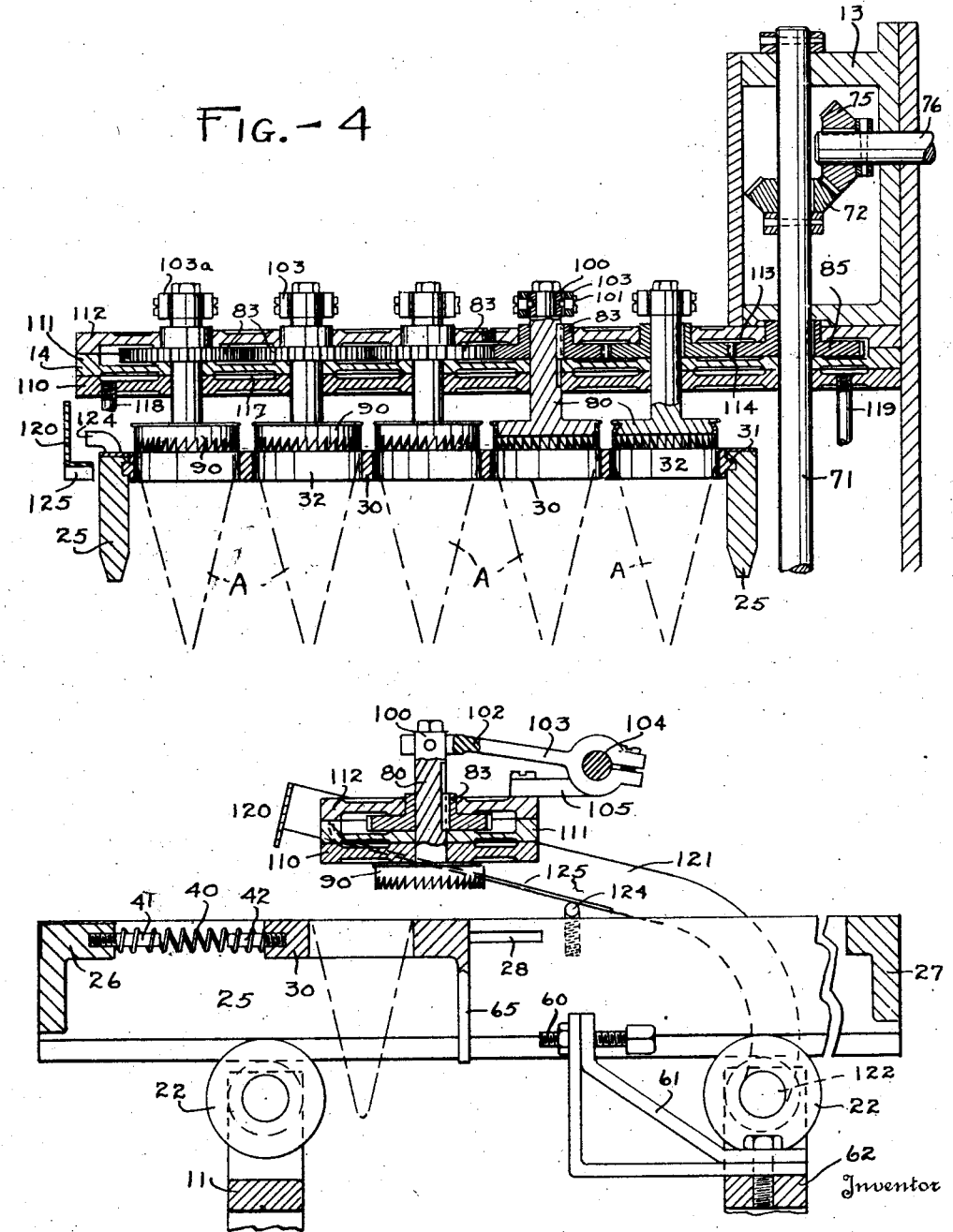

June 5, 1928.
J. T. TURNER
TRIMMING MACHINE FOR PASTRY
Filed May 5, 1926
1,672,550
4 Sheets-Sheet 4
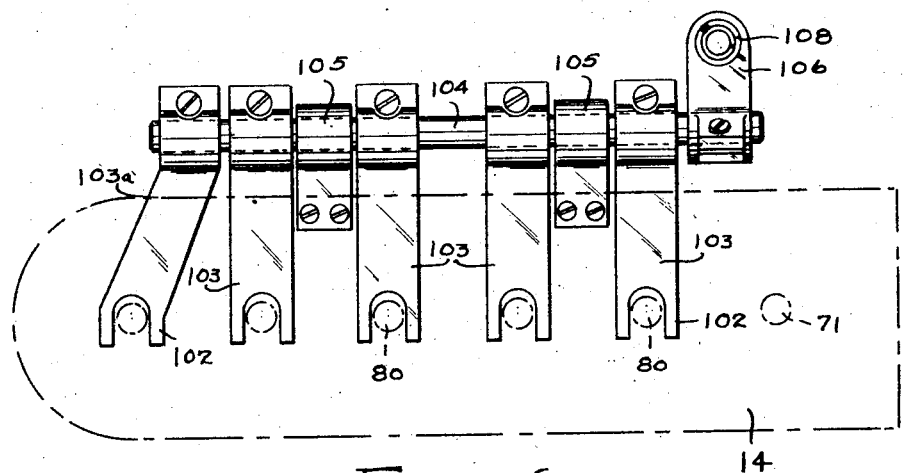
FIG.-6
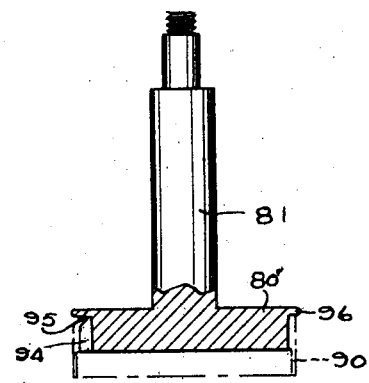
FIG.-7
FIG.-8
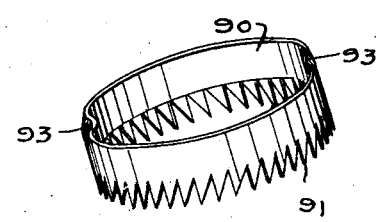
FIG.-9
Inventor
James T. Turner,
By Davis, Macklin, Gobrick & Fear
Attorneys Patented June 5, 1928.

1,672,550

UNITED STATES PATENT OFFICE.

JAMES T. TURNER, OF ATLANTA, GEORGIA.

TRIMMING MACHINE FOR PASTRY.

Application filed May 5, 1926. Serial No. 106,809.

This invention relates to a machine for trimming articles of pastry by a circular incision through surplus material about the article. The machine is intended to operate on pastry after it has been baked. While it may be used for various kinds of pastry, it is particularly well adapted for trimming ice cream cones. My prior Patents, Nos. 1,393,587 and 1,573,585 issued October 11th, 1921, and February 16th, 1926, respectively, illustrate a machine for making ice cream cones adapted to produce cones in sets of five side by side arranged transversely of an endless belt of molds in which the cones are baked. Each of such cones when thus produced has at its top an external flange of the cooked batter; in fact several, and sometimes all, of the five cones are connected together by such flange.

My invention as hereinafter described is adapted to receive such cones individually or connected, and automatically trim off the flange and discharge the completed cone. Preferably the machine trims simultaneously the same number of cones as constitute a set in the baking machine. A preferred embodiment of the machine is shown in the drawings and hereinafter described in detail. The essential novel features of the invention are set out in the claims.

Figure 2:
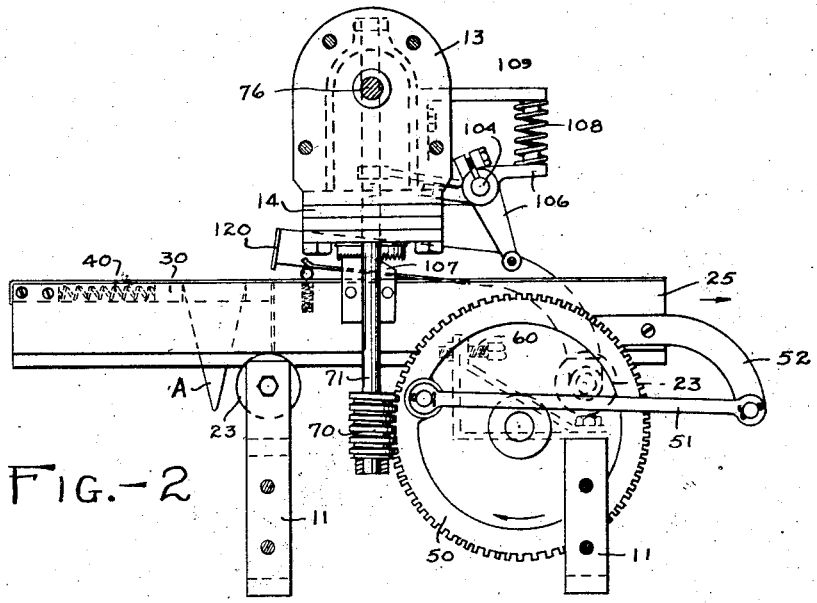
Figure 3:
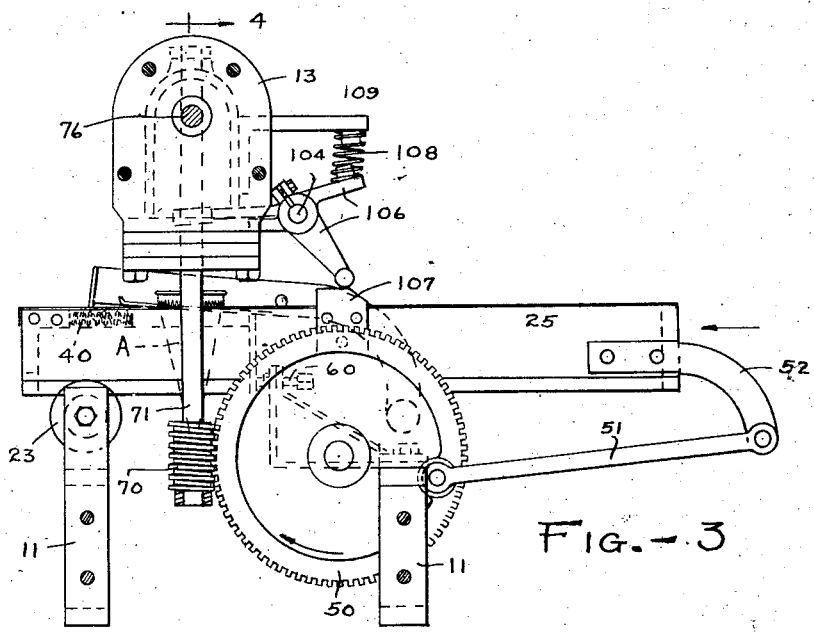

In the drawings, Fig. 1 is an end elevation of a machine; Fig. 2 is a sectional elevation at right angles to Fig. 1, as indicated by the line 2—2 on Fig. 1; Fig. 3 is a similar view in a different position; Fig. 4 is a vertical section along the axis of the series of cones as indicated by the line 4—4 on Fig. 3; Fig. 5 is a vertical cross-section at right angles to Fig. 4, as indicated by the line 5—5 on Fig. 1; Fig. 6 is a plan of a portion of the machine showing the rock shaft for operating the various trimmers; Fig. 7 is a vertical section of the trimmer head on a larger scale than Fig. 4; Fig. 8 is a bottom plan of such trimmer head; Fig. 9 is a perspective of the trimmer knife removed.

As shown in Fig. 1, 10 indicates a suitable support for the various parts of the machine frame. This frame includes a laterally extending bracket 11 supporting a slide carrying the cones; another bracket 12 extending in the opposite direction and supporting the driving motor; third a box-like housing 13 carrying a secondary shaft and gearing thereto from the armature shaft, and fourth, a member 14 extending horizontally from the bottom of the box-like frame 13 and supporting the various cutters which act at their lower edges on the tops of the cones.

The bracket 11 carries suitable studs 20 and 21 on which are mounted rollers 22 and 23. Journalled on these rollers is a traveling frame 25 which has two side bars resting on the rollers and cross bars 26 and 27 at the ends, this traveling frame thus being an open rectangular member. Slidably mounted in the traveling frame is a supplemental frame 30 which carries the cones. This supplemental frame, as shown, comprises a plate having ribs 31 at its ends which occupy horizontal grooves in the side members of the traveling frame 25. Through the plate are circular holes 32 slightly larger in diameter than the maximum external diameter of the baked cones. The cones, indicated by A, are thus adapted to occupy these openings 32 and before being trimmed be supported by their flanges $a$ resting on the top of the plate immediately around the openings 32. When the annular cutting knives hereinafter described trim off these flanges, the cones drop by gravity.

The supplemental frame 30, while slidable on the main frame 25, is provided with one or more springs tending to hold it against a suitable stop in the main frame. Thus, I have shown a pair of helical compression springs 40 at opposite ends of the supplemental frame mounted on studs 41 carried by the main frame and studs 42 carried by the supplemental frame. These springs tend to press the supplemental frame against stops 28 on the main frame.

Mechanism about to be described reciprocates the main and supplemental frames to bring the supplemental frame into an accessible position where the cones may be placed in the openings 32 and then to carry the supplemental frame beneath the annular cutters. As shown this mechanism comprises the continuously rotating wheel 50 connected by a pitman 51 to an arm 52 rigidly secured to the main frame 25. Such mechanism is operative to reciprocate the main frame, reducing the speed of reciprocation to a minimum as the end of the stroke is approached, and then after the dead center is past gradually accelerating the movement in the opposite direction. The comparatively slow movement near the forward end of the stroke allows time for the cones to be placed in the openings of the supplemental slide.

Near the rear end of the stroke, when the cones are being trimmed, it is desirable that they be held absolutely stationary, and it is for this reason that the supplemental frame is spring held and may be stopped independently of the main frame. To stop the supplemental frame in accurate position I provide adjustable stop screws 60 carried by brackets 61 mounted on a portion 62 of the frame bracket 11. These adjustable stop screws 60 coact with depending tongues 65 on the supplemental frame, and retain that frame with the holes 32 accurately registering with the annular knives above them, while the traveling frame continues its movement and starts the return on the reverse stroke. The period of rest of the supplemental frame is sufficient for the knives to trim off the flanges of the cones, so that the latter drop by gravity into a suitable receptacle or onto a discharge conveyor, not shown. Thus, the return stroke of the supplemental frame is completed with the openings 32 thereof empty.

To rotate the wheel 50 at the desired comparatively slow speed, I prefer to make it in the form of a worm wheel as shown. Meshing with this wheel is a worm 70 on a vertical shaft 71 which has a lower bearing (carried in a bracket projecting from the frame member 10) and upper bearings in the box-like frame 13. Within the latter frame, this shaft carries a bevel gear 72 which meshes with a bevel gear 75 on the armature shaft 76 of the motor 77.

The horizontally extending frame member 14 above referred to, which stands above the traveling frames, carries the rotating cutters. Five of these cutters are shown, each comprising a head 80 and a concentric shank 81. The shanks are slidably mounted in the frame 14. Splined on each shank is a gear 83. These gears engage each other successively as shown in Fig. 4. The gear 83 nearest the shaft 71 meshes with a gear 85 on that shaft. It thus results that the cutter heads are all continuously rotated, some in one direction and some in the opposite direction.

Each cutter head carries an annular cutter knife 90 hereinafter described in detail. On each cutter spindle 81 in its upper end is a loose collar 100, engaged by inwardly extending pins 101 on the bifurcated ends 102 of the rock arms 103. These rock arms are rigidly mounted on a rock shaft 104, which thus serves to simultaneously depress or raise all of the cutters.

To operate the rock shaft, I mount rigidly on it a bell crank 106 having a depending arm adapted to be acted on by a cam 107 on the traveling frame 25. The other arm of the bell crank is acted upon by a compression spring 108, bearing against a stationary bracket 109 carried by the box-like frame 13. The cam operates to swing the bell crank in the direction to depress the cutters into their active position to trim the cone flanges. The spring 108 operates to raise the cutters to idle positon when the cam 107 on the return stroke clears the bell crank. The various rock arms and the bell crank are adjustably mounted on the rock shaft to effect accurate presentation of the cutters, but in operation are rigid with the shaft.

The rock shaft 104 is mounted in suitable bearings 105 on the frame bracket 14. All of the rock arms 103 are identical except the endmost arm designated 103$^a$ in Fig. 1, which, to shorten the shaft 104, is mounted on the overhanging end of that shaft.

In the operation of the mechanism described, just as the tongue 65 is about to engage the stop 60, the cam 107 acts on the bell crank 106 to lower the various cutters 90 so that their annular cutting edges will act to trim off the cones. These cutters descend into engagement with the cone flanges just after the supplemental frame has been stopped. The cutters may project slightly within the openings 30. They operate to entirely free the cones from the flanges, allowing the trimmed cones to drop by gravity.

The operation just described takes place while the crank pin of the wheel 50 is moving past its inner dead center, and the supplemental frame is stationary. On the return stroke, before the supplemental frame begins to move, the cam 107 clears the bell crank and the spring 108 raises the cutters.

The annular cutters 90 are preferably readily removable from the cutter heads 80 but are rigid thereon in operation. I found it very simple to make these annular cutters in the form of sheet metal rings having saw teeth 91 about their lower periphery, these rings being indented adjacent their upper edges at two diametrically opposite points as shown at 93 in Fig. 9. The cutter heads have vertical grooves 94 corresponding to these projections and then have recesses 95 of less depth on opposite sides of the recesses 94. When the cutters are shoved upwardly into place against a flange 96 on the head the projections 93 register with the recesses 94; then a slight turning of the cutter knives causes such projections to bind snugly in the reduced recess 95 after the manner of a bayonet lock. In operation the projection 93 abuts against the shoulder, the end of the recess 95, whereby the cutter is driven by the rotating head.

I have shown the recess 95 as extending in each direction so that the same cutter head construction is suitable for each spindle irrespective of the direction of rotation. It will be seen that the cutters may be readily removed from their heads and rotatably mounted thereon whenever the traveling frame is adjacent its outward position, thus rendering the heads accessible.

The trimming of the cones leaves the flanges more or less connected, resting on top of the supplemental frame. To remove such flange with each cycle of operation, I provide a scraping blade 120 normally held above the frame but adapted to coact with it on the return stroke of the traveling frame after the cones have been trimmed. This blade extends in a direction substantially parallel with the length of the supplemental frame and is supported at its ends by a pair of arms 121 pivoted at 122 to the stationary bracket 62. When the traveling frame is in its inmost or cutting position, the blade 120 is held elevated as shown in Fig. 5 by L-shaped pins 124 mounted on the traveling frame and engaging beneath ledges 125 on the arms 121. These pins thus operate to elevate the blade 120 as the frame moves inwardly. As the frame reaches its innermost position the pins 124 clear the ledges 125 and the blade drops downwardly onto the supplemental frame just in front of the cone flanges. Now on the returning stroke, the horizontal portions of the pins 124 travel over the ledges 125 and the blade remains in engagement with the supplemental frame and thus scrapes off the cone flanges as the supplemental frame travels outwardly beneath the blade.

It will be seen that as the supplemental frame moves forwardly the waste is scraped off, most of it falling at the rear of the supplemental frame or some of it falling through the openings thereof. In either case this refuse drops independently of the receptacle for the cones. The operator, or a conveyor, may position a paste board box for the cones beneath the supplemental frame just as the cones are about to be delivered to receive them without handling, or they may fall into a general receptacle or be otherwise received.

It is desirable that the train of gears 83, 85 for the cutter spindles operate in lubricant. It is desirable also that means be provided for keeping such spindles and lubricant cool, so that the machine may be mounted immediately adjacent to a baking machine and operate on cones which are warm. To this end I provide the peculiar jacketing support 14 for the cutter spindles shown in Figs. 4 and 5.

Referring to Figs. 4 and 5, it will be seen that the stationary frame member 14 comprises three surmounting plates 110, 111 and 112 which are rigidly secured together. Coacting recesses formed in the plates 111 and 112 provide space for the gears 83 and 85 and also space 113 above the gears and space 114 below them for lubricant. This lubricant is inserted through suitable oiling openings.

The lower face of the intermediate plate 111 and the upper face of the plate 110 are recessed to provide a water chamber 117. Water may be circulated through this chamber by means of suitable pipes 118 and 119. Thus the cutters and their lubricant are maintained sufficiently cool.

My trimming machine is comparatively simple in construction, is compact, and may be readily mounted at the delivery end of an ice cream cone baking machine. Practice has demonstrated that it is efficient and rapid in operation and that the cutters remain clean and sharp, neither soiling or cracking the cones.

Having thus described my invention, I claim:—

1. In a machine for removing flanges from articles of pastry, the combination of a slide having a hole adapted to receive the article proper with its flange overhanging the slide about the hole, and a rotary annular cutter adapted to coact with the article adjacent the edge of the hole to free it from the flange, and means for reciprocating the slide transversely of the axis of the cutter to bring the hole into registration with the cutter.

2. In a machine of the character described, the combination of an annular cutter, means for rotating it and for reciprocating it axially, a slide having a hole through it adapted to receive the article to be trimmed with its flange overhanging the slide about the hole, and means for reciprocating the slide transversely of the axis of the cutter to bring the hole and cutter into registration.

3. In a machine of the character described the combination of a support, a row of annular cutters rotatably mounted therein, a reciprocatory slide having a row of holes adapted to receive the articles to be trimmed, means for rotating the cutters and means for reciprocating the slide transversely of the axes of the cutters, the inner diameter of the cutters being no greater than the diameter of the holes whereby the trimmed articles may drop through the holes.

4. In a machine of the character described, the combination with a cutter, of a reciprocatory slide, a supplemental slide carried by said reciprocatory slide and adapted to hold the article to be trimmed, mechanism for reciprocating said reciprocatory slide, and a stop to limit the movement of the supplemental slide in position to coact with the cutter while the other slide is moved.

5. The combination of a series of cutters, a reciprocatory slide, a supplemental slide movably mounted therein and having a series of holes corresponding to the cutters, means for moving the reciprocatory slide and means for holding the supplementary slide in fixed position in registration with the cutter while the other slide is moved.

6. The combination of a cutter, of a main slide, a crank and pitman for reciprocating the main slide, a supplemental slide on the main slide, and a stop for limiting the movement of the supplemental slide in registration with the cutter while the main slide is moving.

7. The combination with a motor, of a gear continuously rotated thereby and having a crank pin, a main slide, a pitman connecting the crank pin with the main slide, a supplemental slide on the main slide, means adapted to stop the supplemental slide before the crank pin has reached its dead center, a cutter, means connected with said motor for rotating it, and means for reciprocating the cutter to coact with the supplemental slide when the latter is stationary.

8. In a machine of the character described, the combination of a series of annular cutters, a slide having corresponding holes for positioning the articles to be trimmed, means for rotating the various cutters, and means for reciprocating the cutters toward and from the slide comprising a rock shaft and rock arms connecting the rock shaft with the cutters.

9. In a machine of the character described the combination of a series of cutters, a slide for positioning the work to be trimmed with reference to the cutters, means for rotating the various cutters and means for reciprocating the cutters toward and from the slide comprising a rock shaft and rock arms connecting the rock shaft with the cutters, a cam on the slide and a rock arm on the shaft coacting with the cam to cause the cutters to engage the articles.

10. The combination with a support, of a row of cutter spindles mounted therein and each carrying an annular cutter, a train of gears for driving said cutter spindles, said spindles having a spline connection with their gears, a rock shaft, arms on the rock shaft coacting with the various cutter spindles, a slide for positioning the work, and a cam on the slide coacting with an arm on the rock shaft to give it a partial rotation to move the cutters to active position.

11. The combination with a support, of a row of cutter spindles mounted therein and each carrying an annular cutter, a train of gears for driving said cutter spindles, said spindles having a spline connection with their gears, a rock shaft, arms on the rock shaft coacting with the various cutter spindles, a slide for positioning the work and a cam on the slide coacting with an arm on the rock shaft, a supplemental slide mounted on the main slide and having means for positioning the work, means for reciprocating the main slide, means for stopping the supplemental slide with the work in registration with the cutters.

12. The combination of a slide having a hole for the article to be trimmed, a cutter for cutting such article free from its flanges, a scraper adapted to engage the face of the slide, and means for moving the slide after the cutting operation to enable the scraper to scrape off the waste.

13. The combination with a cutter, of a reciprocatory slide having means for holding the work to be trimmed, means for moving said slide to carry the work into registration with the cutter and then returning the slide, and a movable scraper adapted to be free from the slide when it is moved in the positioning direction and engage it when it is moved in the opposite direction.

14. The combination with a cutter, of a slide adapted to hold the work to be trimmed, a scraper blade, a pivot arm carrying the same, means on the slide engaging the arm and adapted to raise the blade to idle position when the slide moves in one direction and adapted to free the arm to allow the scraper to engage the slide on the opposite direction of movement.

15. The combination of a rotary cutter, a slide for holding the material to be trimmed, means for reciprocating the slide to position such material in registration with the cutter, a scraper blade, a pivot arm carrying the same and having a ledge and means on the slide adapted to engage beneath the ledge to raise the arm as the slide moves into working position and to free the ledge to allow the blade to drop and engage the slide when it returns.

16. In a machine of the character described, the combination of a series of cutters, a slide having a series of holes for holding the articles to be trimmed, means for rotating the various cutters, means for reciprocating the cutters toward and from the slide, means for reciprocating the slide to position the articles in registration with the cutters, a scraper blade, pivotal means carrying the same and means on the slide adapted to engage such carrying means to raise the blade as the slide moves into working position and to free the blade to enable it to engage the slide when the slide returns.

17. In a machine of the character described, the combination of a row of rotary cutters, an arm for carrying the same, providing bearings for the cutter spindles, said arm including a pair of surmounting plates having a recess between them and means for conducting cooling liquid to and from said recess.

18. In a machine of the character described, the combination with a row of cutters, of an arm for carrying the same and comprising three surmounting plates through which the spindles of the cutters extend, gears for driving the cutters mounted between the intermediate plate and one of the extreme plates, and a water jacket between such intermediate plate and the other extreme plate.

19. The combination of a main slide, means for reciprocating it, a supplemental slide caried by the main slide and adapted to support the article to be trimmed, a spring tending to move the supplemental slide relative to the main slide, a cutter, and a stop for limiting the movement of the supplemental slide and constraining the spring while the main slide continues to move, to maintain the article in registration with the cutter.

20. In combination with a main slide, a continuously rotating crank, a pitman connecting the crank pin with the main slide, a supplemental slide on the main slide, a spring pressing the supplemental slide in a direction in which the main slide moves, an adjustable stop adapted to engage the supplemental slide before the crank pin has reached its dead center, and a cutter operating in an annular path and adapted to coact with material on the supplemental slide.

21. In a machine of the character described, the combination of a row of annular rotating cutters, a main slide, a supplemental slide thereon movable in the same direction as the main slide, and having a row of openings corresponding to the cutters, a driving crank having a pitman connecting it with the main slide, a spring between the main slide and supplemental slide tending to hold the supplemental slide against a stop on the main slide, and a stop independent of both slides limiting the movement of the supplemental slide to maintain said openings in position to cooperate with the cutters while the main slide completes its movement.

In testimony whereof, I hereunto affix my signature.

JAMES T. TURNER.